July 10, 1928.  
W. LOTTERMAN ET AL  
1,676,738  
AUTOMATIC WOODWORKING MACHINE  
Filed Jan. 26, 1925  
8 Sheets-Sheet 6
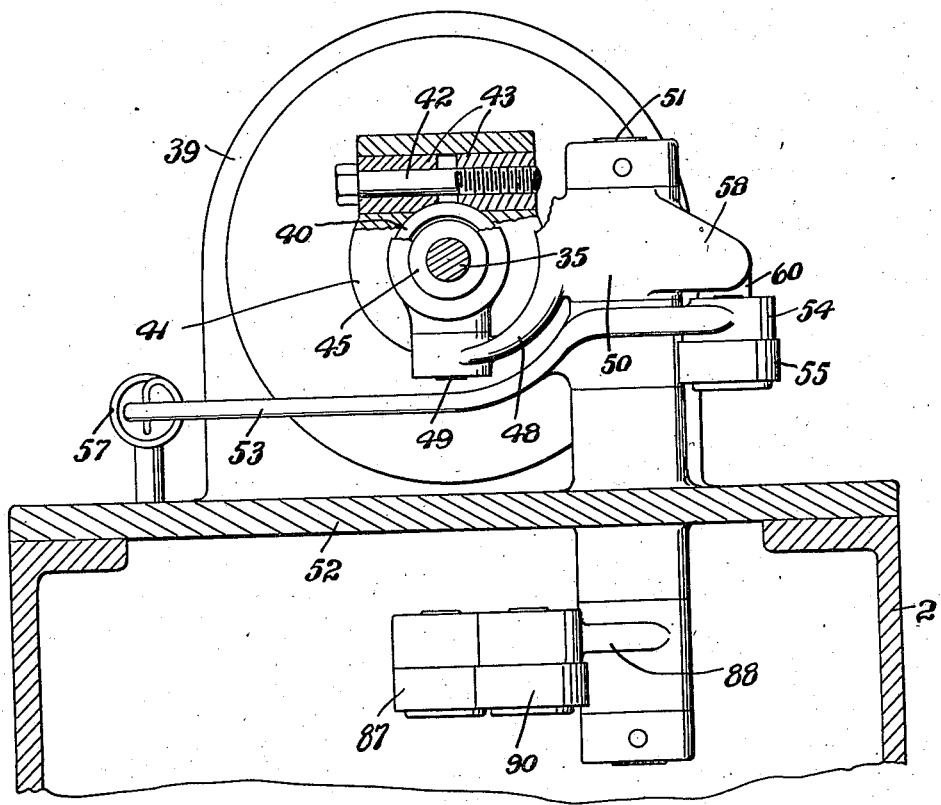
Fig. 6.
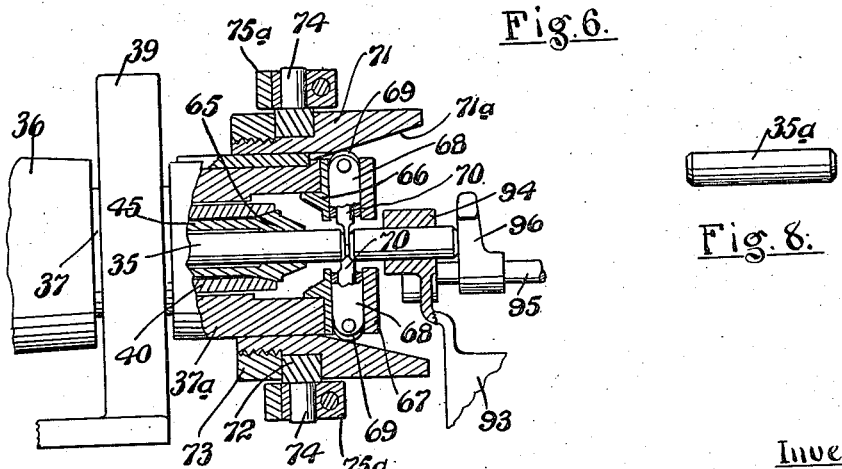
Fig. 7.
Fig. 8.
Inventors  
William Lotterman  
Leonard B. Lester  
Merritt K. Orton  
By Frank E. Liverance, Jr.  
Attorney Patented July 10, 1928.

1,676,738

UNITED STATES PATENT OFFICE.

WILLIAM LOTTERMAN, LEONARD B. LESTER, AND MERRITT K. ORTON, OF GRAND RAPIDS, MICHIGAN.

AUTOMATIC WOODWORKING MACHINE.

Application filed January 26, 1925. Serial No. 4,718.

This invention relates to an automatic wood working machine by means of which a variety of wood turning or cutting operations may be performed on a continuous length of material, which may be turned and cut into shorter lengths or variously formed as desired. As one operation which may be performed by the machine and which is illustrated in the drawings forming part of this description, it can cut dowels very quickly and rapidly. By use of different tools to operate upon the length of material fed into the machine different articles can be formed.

It is an object and purpose of the present invention to construct a practical and operative machine of this character particularly effective for the work which it is designed to produce and by means of which a large quantity production can be obtained. The invention consists in many novel details of construction and arrangements of parts for practically and effectively attaining the results above stated, as well as many others not at this time enumerated but which will appear as an understanding of the invention is had from the following description taken in connection with the accompanying drawings in which, Fig. 1 is an elevation of the machine with parts broken away for a disclosure of the interior mechanism.

Fig. 6 is a fragmentary transverse vertical section substantially on the plane of line 6 of Fig. 2.

Fig. 7 is a fragmentary longitudinal vertical section of the front portion of the machine, illustrating the cutters in a different position from that shown in Fig. 2, the cutters being shown in Fig. 7 as operating to cut a dowel and in Fig. 2 in an inoperative position.

Fig. 8 is a view of a dowel which may be formed by the machine with the cutters shown.

Like reference characters refer to like parts in the different figures of the drawings.

Figure 1:
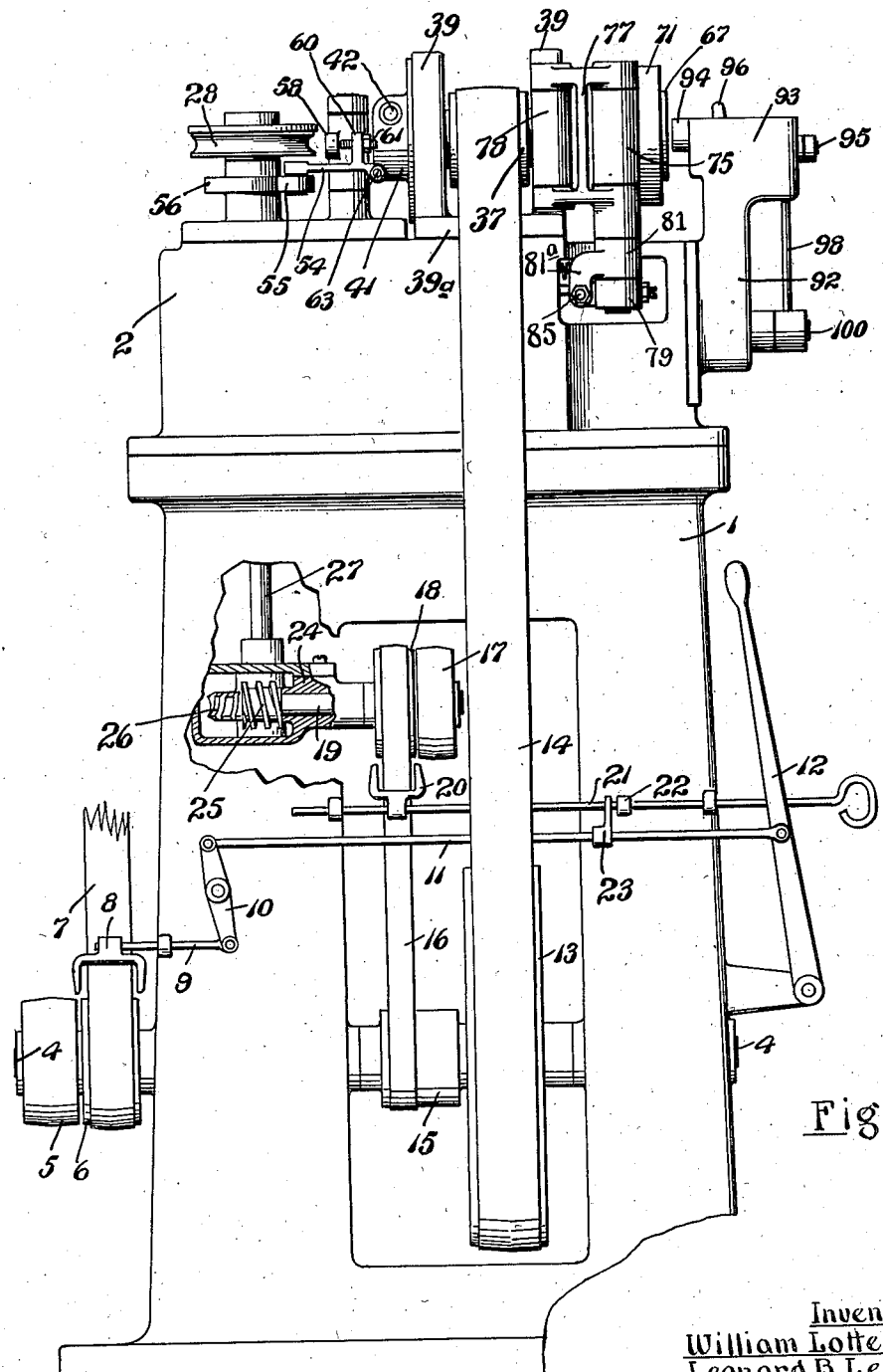

In the construction of the machine, a hollow supporting pedestal 1 of iron is used, at the upper end of which is a hollow housing 2 forming in effect a vertical extension to the pedestal 1, the same having an open bottom and a top 3 through which openings are made for the passage of different vertically extending parts of the mechanism. A shaft 4 is mounted horizontally on the pedestal 1 toward its lower end, at one end extending beyond the rear side of the pedestal and carrying loose and fixed pulleys 5 and 6, respectively, with which a drive belt 7 connected with any suitable source of power may be associated. The belt is shiftable from the loose to the fixed pulley and vice versa through a belt shifter fork 8 fixed at the end of a slidable rod 9 which, at its opposite end, is connected to the lower end of a lever 10 pivotally mounted between its ends on the pedestal 1. A rod 11 is pivotally connected to the upper end of the lever 10 and extends horizontally across a side of the machine, having connection at its front end to a hand lever 12, operation of which shifts the belt 7 from a pulley 5 or 6 to the other.

On the shaft 4 a relatively large drive pulley 13 is fixed around which a drive belt 14 passes for driving mechanism hereafter described and located at the upper end of the machine. Alongside the pulley 13 is a second wider and much smaller drive pulley 15 adapted to drive, through a belt 16, either the loose or fixed pulley 17 or 18 mounted on a shaft 19 a distance above the drive shaft 4. The belt 16 is shiftable from the loose pulley 17 to the fixed pulley 18 or back through a shifting fork 20 associated with the belt and fastened to a horizontal rod 21, which is slidably mounted a short distance above and parallel to the rod 11 previously noted. The front end of rod 21 is formed with a hand hold for manual operation. A collar 22 is fixed on rod 21 between its ends, back of which is a collar 23 formed with a projecting finger fixed on the rod 11, the finger coming directly back of the collar 22. It is evident that on grasping the lever 12 and moving it in a forward direction the finger of collar 23 engages against the collar 22 and moves the rod 21 in a forward direction shifting the belt 16 from the fixed pulley 18 to the loose pulley 17 simultaneously with the shifting of belt 7 from the fixed pulley 6 to the loose pulley 5. Accordingly, with the operation of the one lever 12 the mechanisms, which are driven by belts 14 and 16, may be simultaneously stopped, but it is only possible to start the mechanism driven by belt 14 first, after which the mechanism driven by belt 16 may be started; and if it should be desired it is possible to shift the belt 16 from the fixed pulley 18 to the loose pulley 17 and leave the belt 7 in engagement with the fixed pulley 6 so as to drive the mechanism which is driven from the drive pulley 13 through belt 14.

Figure 3:
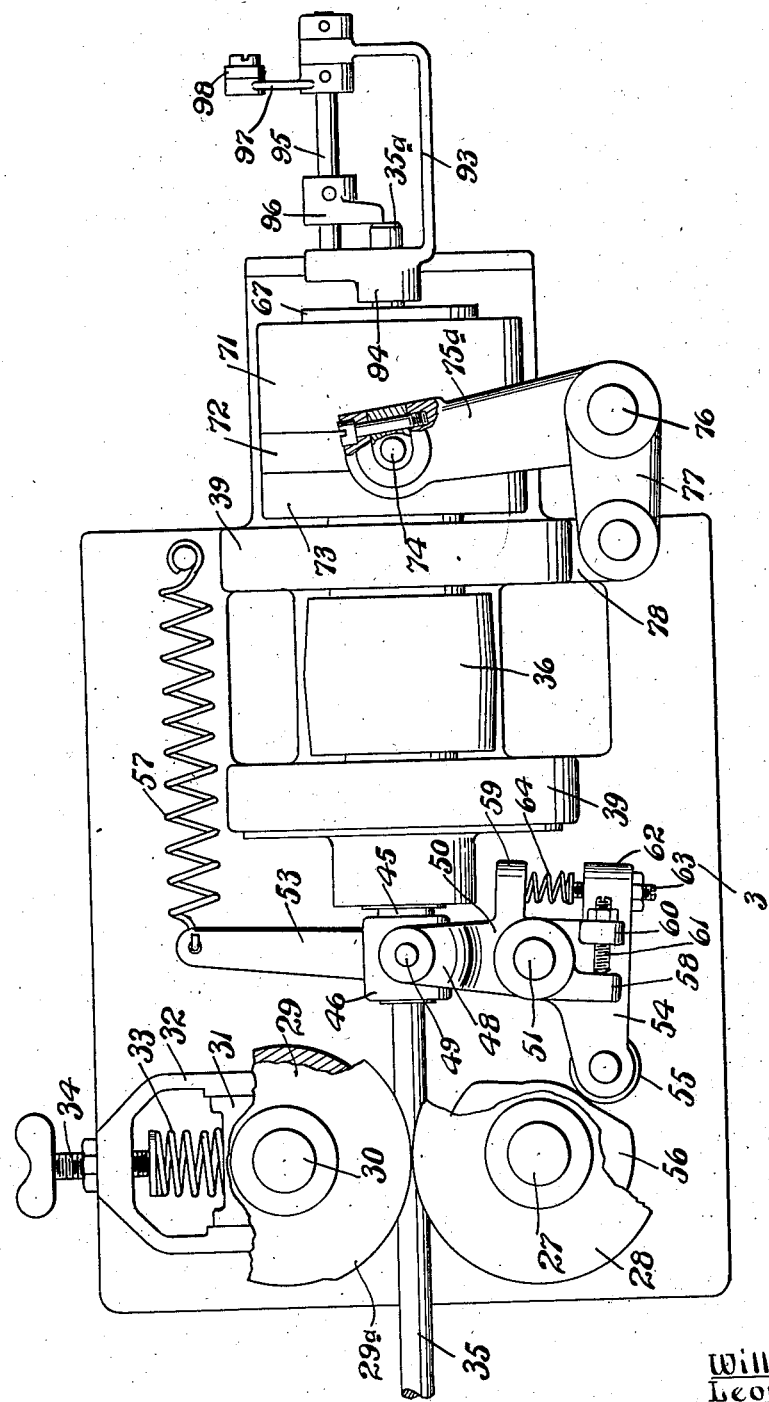
Fig. 3 is a plan view of the machine with parts broken away and in section for better disclosure of the construction.

The shaft 19 is supported on and passes into a housing 24 being equipped at its inner end with a worm 25 which engages with a worm wheel 26 secured at the lower end of a vertical shaft 27. The shaft 27 extends upwardly through an opening in the top 3 of the housing 2 and at its upper end is equipped with a grooved feed roller 28. A complementary grooved feed roller 29 is located at one side of and in the same plane with the roller 28, being fixed at the upper end of a vertical shaft 30, the driving and mounting of which will be hereafter described. Shaft 30 passes downwardly through a journal block 31 slidably mounted for lateral movement in a frame 32 on the upper side of the housing 2. The journal block 31 is acted upon by a coiled spring 33 under compression, the force of which may be adjusted and regulated by an adjusting screw 34 threaded through the end of the frame 32, as shown in Fig. 3. Between the feed rollers 28 and 29 the work to be operated upon is passed, consisting, as illustrated, of a cylindrical rod 35 of wood from which dowel pins are to be made.

In front of the feed mechanism a pulley 36 is located. It is fastened to and around a hollow sleeve 37 having an enlarged cylindrical front end 37a, and mounted for rotation in anti-friction bearings 38 in spaced apart standards 39 integrally formed with a base 39a which connects the lower end of the standards and which is located above and secured to the top 3 of the housing 2. The pulley 36 is located between the standards 39 and the belt 14 passes around the same, while the enlarged head 37a is located in front of the front standard 39.

Within the sleeve 37 a tubular sleeve 40 is positioned, extending at its rear end beyond the rear end of the sleeve 37 and clamped in a member 41 secured to the rear side of the rear standard 39. The sleeve 40 is clamped by means of a screw bolt 42 and two clamping sleeves 43, as best shown in Fig. 6, and it is evident that this sleeve is subject to some longitudinal adjustment which may be had by loosening the bolt 42. That portion of the sleeve in front of the member 41 is free and unsupported and extends to and part way through the enlarged head 37a of the sleeve 37. The front end of the tubular sleeve 40 is machined on its inner side so as to make a conical seat 44 for a purpose which will later appear.

Within the tubular sleeve 40 a third sleeve 45 is located through which the rod 35 is adapted to be fed. Sleeve 45 is also free from support at its front end and at its rear end extends a short distance back of the second sleeve 40 described and has a collar 46 secured thereto. Yoke arms 48, one above and one below the collar, are fastened at their ends to the collar by pins 49, which also serve as set screws for attaching the collar to the sleeve 45. These yoke arms are formed at one end of a lever 50 mounted for rocking movement on a vertical shaft 51 which extends downwardly through and is carried by a plate 52. This plate serves also to pass and provide bearings for the upper portion of the shafts 27 and 30 previously described.

Directly below the lever 50 a bell crank lever is loosely mounted on the shaft 51 having a relatively long arm 53 which passes under the collar 46, and a shorter arm 54 turned substantially at right angles, at its free end being equipped with a roller 55, which bears against the edge of a cam 56 pinned to the shaft 27. This cam is of irregular form and it is evident that with the rotation of the shaft 27 the bell crank lever is rocked, the roller following the edge of the cam and being held securely thereagainst by a coiled spring 57 attached to the arm 53 of the lever.

The lever 50 is formed with a projecting lug 58 as shown in Fig. 3, and also with a second lug 59 projecting substantially at right angles to the lug 58. The arm 54 is formed with an integral vertically extending lug 60 through which a screw 61 passes, the end of which bears against a side of the lug 58. The arm 54 is also extended to provide a lug 62 through which a screw 63 passes between the end of which and the lug 59 a coiled spring 64 is located. By means of this construction the lever 50 is operated by the bell crank lever but the operation is not so positive that the levers will be broken should there be any interference with their free operation; that is the lever 50 is operated through the coiled compression spring 64 which permits a certain latitude of movement of the bell crank lever without moving the lever 50 should an obstacle be encountered which tends to stop movement of lever 50.

The front end of the sleeve 45 extends beyond the front end of sleeve 40 and is formed into a head 65 which is radially slotted and formed with conical sides 65a adapted to fit the conical seat formed at 44 in the front end of the tubular sleeve 40. The operation of the levers described by the cam 56 serves to move the collar 46, and the sleeve 45 to which it is attached, rearwardly and bring the sides at 65a on the head 65 against the seat at 44 thereby causing the sectors of the head to grip the rod 35 which passes through sleeve 45, and hold it securely against movement. This occurs periodically or once with every revolution of the shaft 27 as is evident. During the momentary period that the rod is thus gripped, the feed rollers 28 and 29, while continuing in operation, are separated a small amount and do not act on the rod, the cam portion 20a on the roller 29 (see Fig. 3) acting to cause such separation at the time the rod is clamped against movement.

Figure 9:
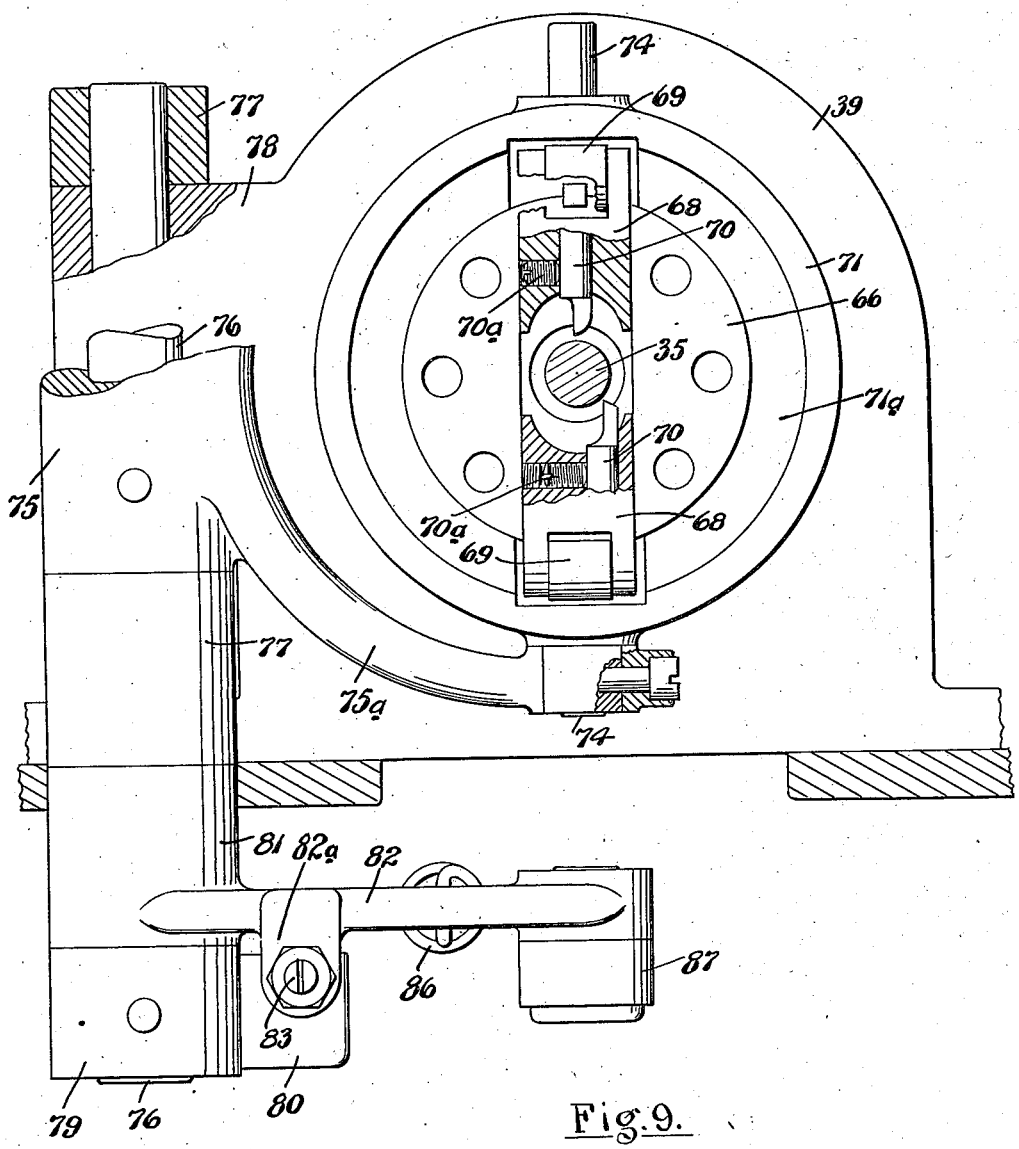
Fig. 9 is a fragmentary vertical transverse section substantially on the plane of line 9 of Fig. 2 and looking to the rear as indicated by the arrow.
Figure 10:
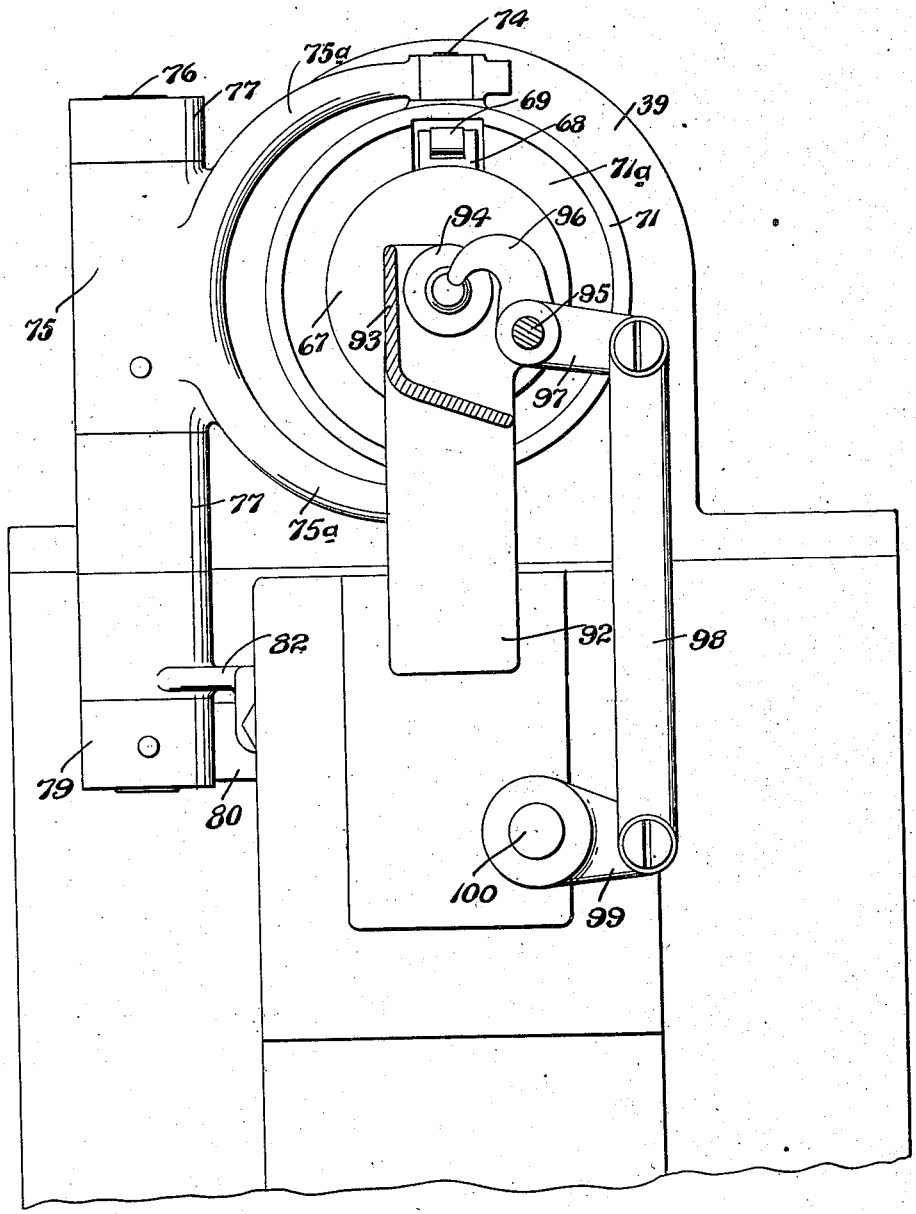
Fig. 10 is a like view on the plane of line 10 of Fig. 2.

At the front end of the head or enlargement 37a of sleeve 37 a circular plate 66 with a central opening therethrough is secured, in the face of which oppositely positioned guide slots are cut and over which a second or retaining plate 67 is located and secured. Within the guides tool holders 68 are slidably mounted, each at its outer end being equipped with a small roller 69 and at its inner end being bored to receive the shank of a cutting tool 70, which may be firmly yet removably held in place by a set screw 70a, as shown in Fig. 9. The cutting ends of the tools extend inwardly and the rod 35, to be operated thereon by said tools, passes through the central openings in plates 67 and 66 and between the ends of the tools which normally are moved outwardly by centrifugal action due to the rapid rotation of the sleeve 37.

Figure 4:
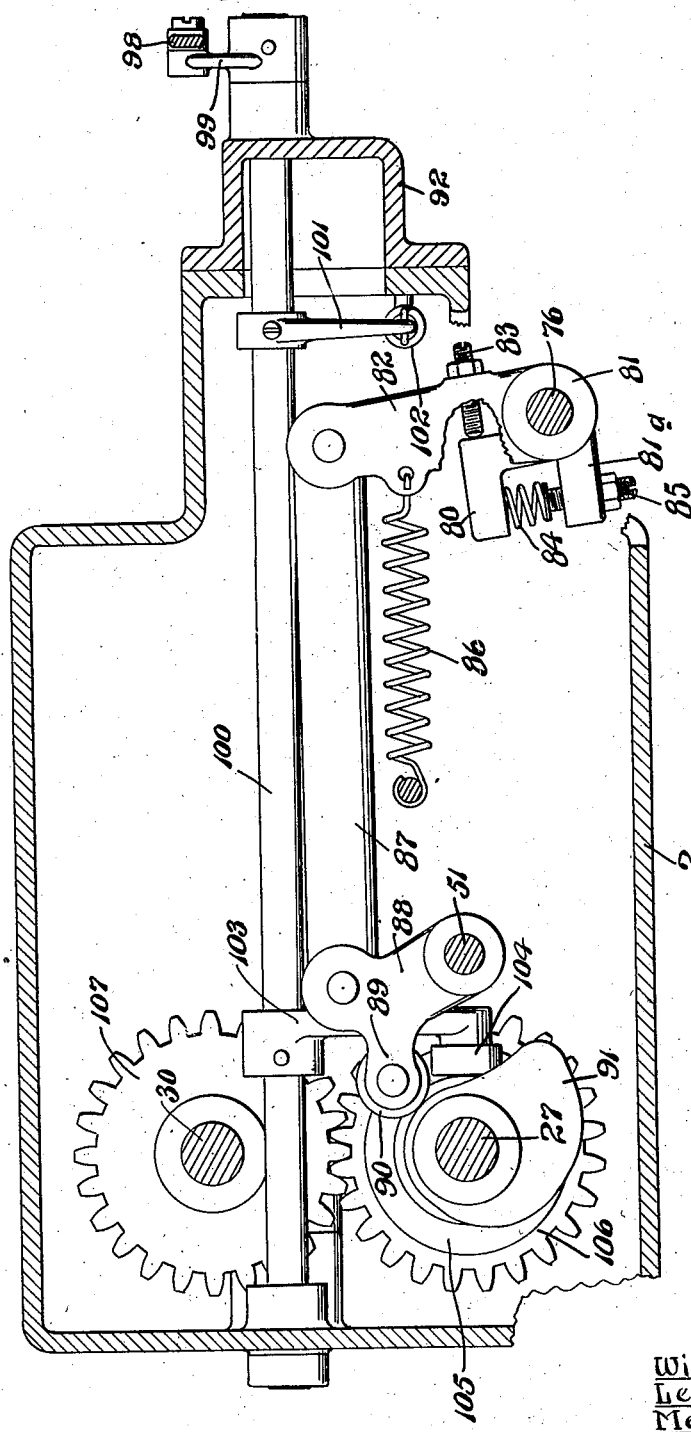
Fig. 4 is a horizontal section taken on the plane of line 4—4 of Fig. 2.

Around the cylindrical head 37a a sleeve member 71 is mounted, being splined thereon so that it rotates with the head but may also have a longitudinal movement with respect thereto. At its outer end the inner sides of the member 71 are machined to form a taper indicated at 71a. It is against the tapered sides 71a that the rollers 69 on the tool holders 68 bear, it being evident that on outward movement of the member 71, the tool holders and the tools carried thereby are forced inward toward each other. A ring 72 is loosely mounted around the member 71 and held thereon by a screw threaded locking ring 73, shown in Figs. 2 and 7. Pins 74 project from the ring 72 at diametrically opposed points, connected with which are the yoke arms 75a of yoke 75 pinned to a vertical shaft 76 which passes freely through upper and lower sleeves or collars of a support 77, in turn supported on a boss or projection 78 extending to one side from the front upright 39 previously described. At the lower end of the shaft 76 a collar 79 is secured by a pin passing through the collar and shaft, from which a lug 80 extends inwardly for a short distance and is then turned at right angles (see Fig. 4). Directly above the collar 79 a collar 81 is loosely mounted on the shaft 76 from which an arm 82 extends inwardly. A set screw 83 threads through a depending lug 82a on said arm at its inner end bearing against the lug 80, previously described. A lug or projection 81a extends from the collar 81 at right angles to the arm 82, as shown in Fig. 4, and a coiled spring 84 under compression is disposed between a set screw 85 passing through the lug 81a and the right angular extension to the lug 80. This construction described is similar in action to that described with reference to the operation of the lever 50 by the bell crank lever associated therewith, and is for the purpose of safe-guarding the mechanism or parts thereof from breaking should there be any obstruction to the free working movement of the sleeve member 71 on the head 37a. A coiled spring 86 is attached to the arm 82, the tendency of which is to draw said arm to the left (see Fig. 4).

Figure 2:
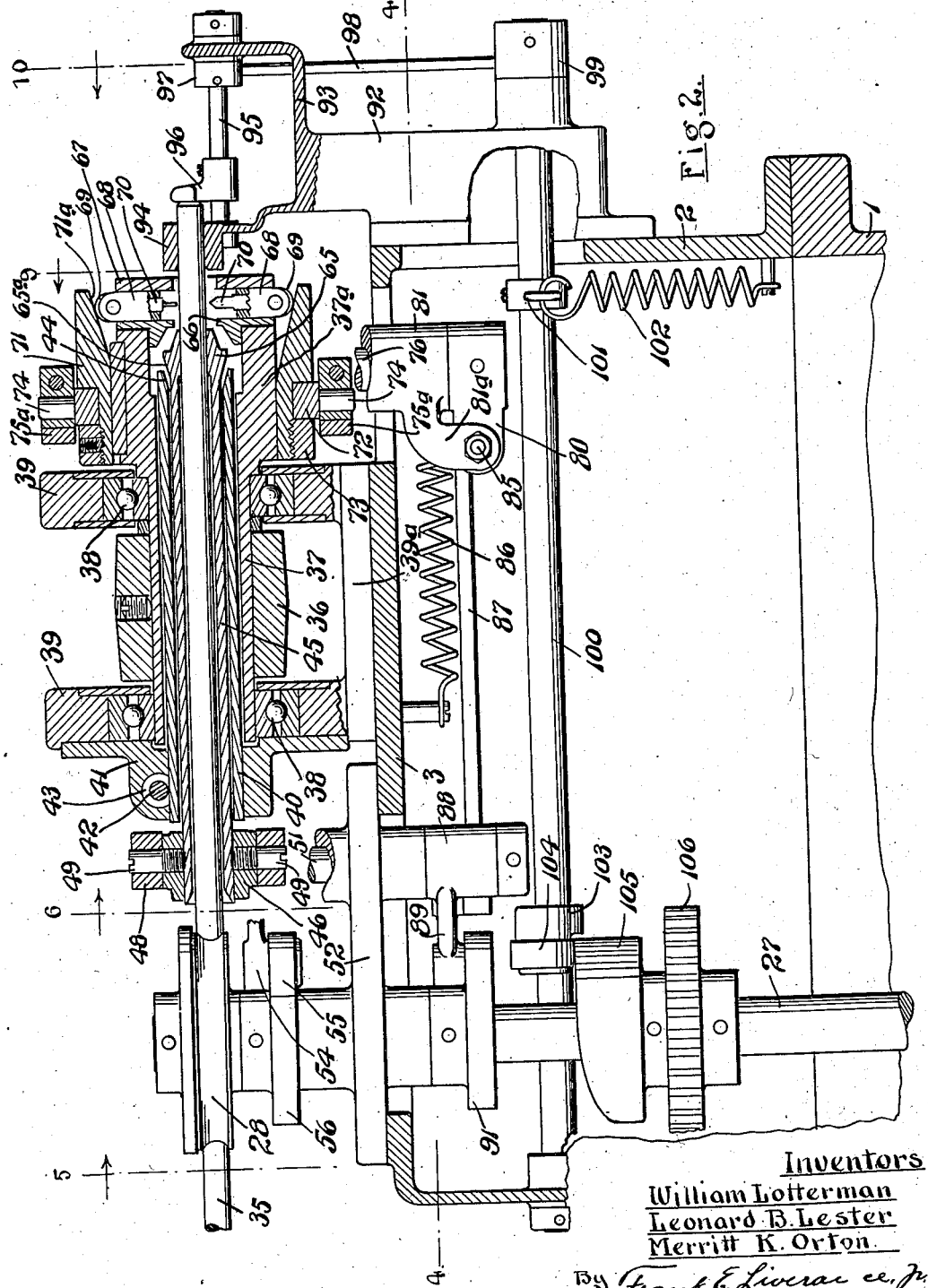
Fig. 2 is a central longitudinal section through the upper part of the machine.

A link bar 87 is pivotally connected at one end to the inner end of the arm 82, extending rearwardly therefrom, and at its rear end is connected to an arm 88 loosely mounted on the shaft 51 below the plate 52. Arm 88 has a lateral branch 89 carrying a roller 90 which bears against a cam 91 fixed to the shaft 27, it being evident that the spring 86 causes the roller 90 to bear at all times against the edges of said cam. The cam is of irregular shape and with each rotation of shaft 27 a reciprocation of the bar 87 takes place with a consequent rocking of shaft 76, which is transmitted through the yoke 75 to the sleeve member 71, causing it to be moved back and forth on the cylindrical head or enlargement 37a of sleeve 37, thereby operating the cutting tools inwardly. At the front end of the housing 2 a vertical support 92 is rigidly fastened, the same being formed at its upper end with an outlet chute 93 having a vertical side, a downwardly inclined bottom, and two vertical ends, one side being open. The end nearest the plate 67 is provided with a guide 94 having an opening therethrough for the free passage of the rod 35. A rock shaft 95 is rotatably mounted on and extends between the vertical ends of said chute being located to one side and a short distance below the guide 94. A stop finger 96 is adjustably mounted on the shaft 95 and may be secured at any point in the length of the shaft to which it is moved by means of a set screw. Adjacent its front end, an arm 97 is fixed on the rock shaft 95 extending laterally and at its outer end having the upper end of a connecting bar 98 pivotally joined therewith, which bar extends downwardly and at its lower end is pivotally connected with the outer end of an arm 99 fixed to the front end of a horizontal rock shaft 100 which extends the full length of the housing 2 and is mounted in bearings at the rear end of the housing 2 and on the support 92, as shown in Fig. 2. An arm 101 is fixed on the shaft 100 and a coiled spring 102 under tension is attached to said arm, the normal tendency of which is to rock the shaft so as to elevate arms 99 and 97 and bring the stop finger 96 to a position directly in front of the guide opening through the guide 94.

Figure 5:
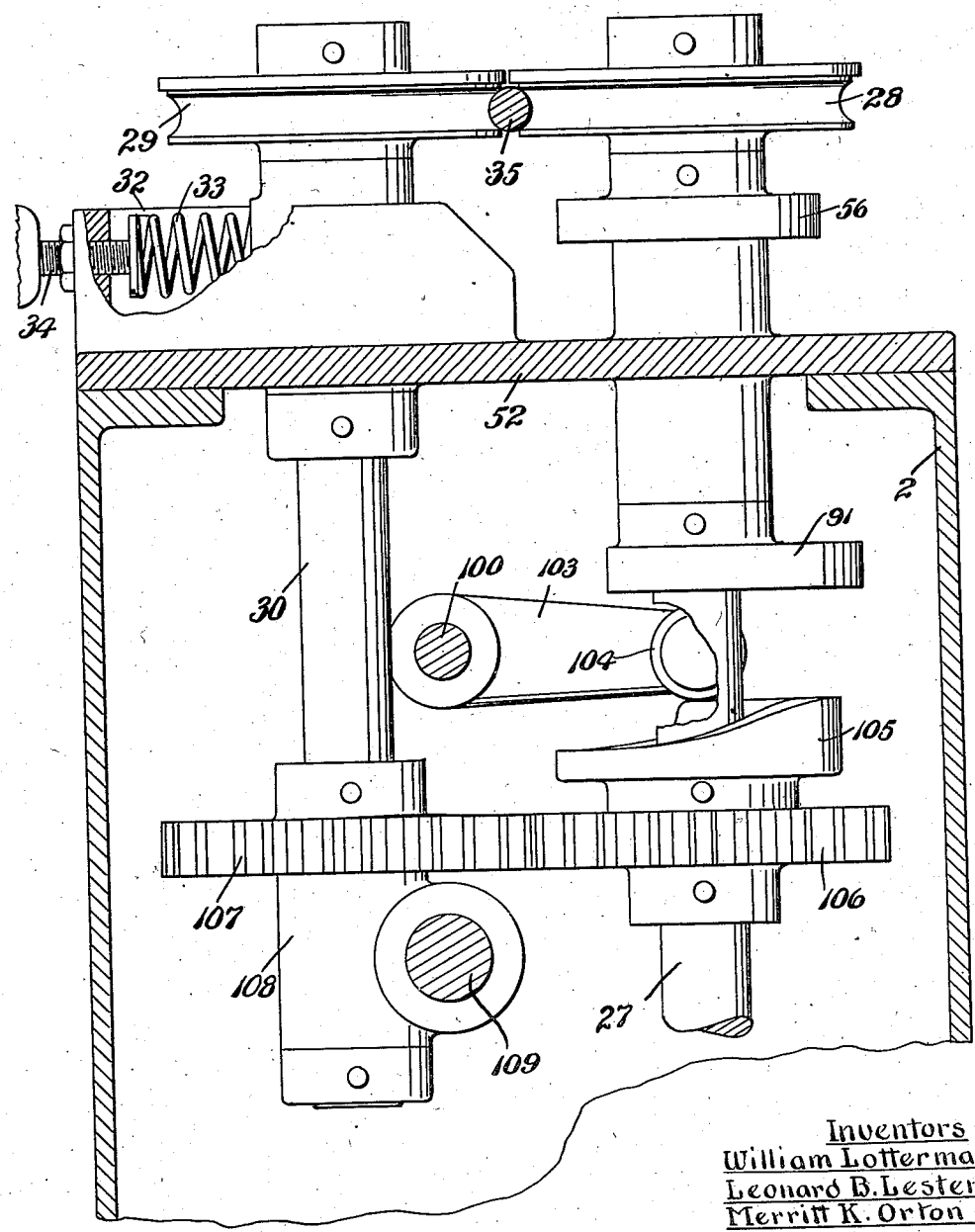
Fig. 5 is a fragmentary transverse vertical section substantially on the plane of line 5 of Fig. 2 and looking in the direction indicated by the arrow.

Near the rear end of the shaft 100 a second arm 103 is secured, projecting therefrom in the same direction as the arm 101 and at its end carrying a roller 104 which bears against a cam 105 pinned to the shaft 27. The roller runs on the upper edge of the cam 105 which, at one point (see Fig. 5), drops abruptly so that the shaft 100 is quickly rocked to bring the stop finger 96 to position directly in front of the guide 94, staying in such position for a part of the revolution of the shaft 27 and then being gradually moved away as the roller is raised to the upper position on the cam, in which position of the roller on the cam the finger 96 is away from in front of the guide 94.

For driving the shaft 30 in synchronism with and in an opposite direction by shaft 27, a gear 106 is fixed on shaft 27 below the cam 105, meshing with a gear 107 of equal size fixed on the shaft 30. Said shaft 30 at its lower end is rotatably mounted in a vertical sleeve 108, which in turn is mounted for rocking movements on a stud 109 which is fixed to the frame, this permitting the limited range of movement which the feed roller 29 may have toward and away from the feed roller 28.

*Operation.*—The rod 35 is passed between the feed rollers 28 and 29 and through the sleeve 45 and guide 94 until its front end strikes against the stop finger 96. Lever 12 may be moved from its forward position to the position shown in Fig. 1, thereby starting shaft 4 and driving the sleeve 37 at high speed. In practice it is desirable that the rotating sleeve 37 be in motion before the mechanism driven by shaft 27 is started. After this has occurred the rod 21 may be operated to force the belt from the loose pulley 17 to the fixed pulley 18 thereby starting shaft 27 in motion, it being evident that this shaft is driven at relatively low speed.

The rotation of the shaft 27 causes an outward movement of the sleeve member 71 with a consequent inward movement of the cutting tools 70 toward and into engagement with the rod 35. Also the rotation of this shaft 27 causes a rearward longitudinal movement of the inner sleeve 45, as has been described, so that the clamping jaws of the head 65 are brought firmly against the rod 35, holding it securely during the time that the tools are working on said rod. The tools form the ends and cut through the rod so that a dowel of the desired length is produced and when this has been completed and the sleeve member 71 moved rearwardly to the position shown in Fig. 2 from that shown in Fig. 7, the cam 105 has moved to a position such that the stop finger 96 is elevated and moved out of the way of the dowel shown at 35ª in Fig. 8 and in the meantime the sleeve 45 has been moved forwardly from the position shown in Fig. 7 to that shown in Fig. 2, rod 35 being fed between feed rollers 28 and 29 so as to push the dowel which has been cut out of the guide 94 which holds it. The dowel drops into the chute and passes therefrom at its open side. The finger 96 moves back to obstructing position after the dowel has dropped from the guide 94 and stops the rod 35 in proper position for the succeeding operation of the cutters on the rod. The position of the finger 96 in shaft 95 controls the length of the dowel.

It is evident that the work performed on the rod is indefinitely repeated as long as there is a rod 35 fed into the machine and that the cycle of operations for the cutting of each dowel repeats itself indefinitely as long as the machine is in operation.

While we have shown cutters of the proper shape to cut dowels from a cylindrical rod of wood it is very evident that many other articles besides dowel pins can be formed on a machine of this character, it being necessary merely to use different types or forms of cutters. For instance, spools can be made or fluted spindles can be readily formed thereon and a great variety of articles may be made with this machine properly designed as to sizes of parts and character of tools 70 to be used for the formation of the particular article desired. The various cams 91, 56 and 105 are so shaped and positioned on the shaft 27 that the movements of the parts of the mechanism are timed so as not to interfere with each other but to complement and further the operation of the machine as a whole.

This construction of machine is very useful for the quantity production of different articles from wood and one salient feature of the invention consists in the means by which the stock from which the articles are made is held rigidly against movement during the time that it is worked upon and the cutters or tools working upon the stock rotate rapidly about the same and are fed automatically inward to perform their operations thereon. There are various other novel and useful features of the construction in the machine all of which are defined in the appended claims. All variations of the construction and detail thereof that come within the scope of said claims are to be considered as comprehended by our invention.

We claim:

1. In a machine of the class described, a support, a horizontal sleeve rotatably mounted in said support, means for continuously driving said sleeve, cutting tools mounted at one end of the sleeve and slidable radially inward or outward thereon, a second sleeve located within the first sleeve and connected to the support, a third guide sleeve located within the second sleeve through which a length of material may be fed, means for moving said guide sleeve longitudinally to bring the same into engagement with the second sleeve and thereby clamp the material against longitudinal movement, and means movably mounted on the first sleeve and engaging with the cutting tools operable to move said tools inwardly toward the material during the times that the material is held against movement, substantially as described.

2. In a machine of the class described, a support, a horizontal sleeve rotatably mounted on the support, means for continuously driving said sleeve, a second sleeve located within and lengthwise of the first sleeve, means for connecting said second sleeve to the support, said sleeve at one end being formed with a tapered seat, a guide sleeve located within the second sleeve through which a length of material may be passed and formed at the same end with a slotted head having portions thereof tapered to fit against the tapered seat in the second sleeve, means for periodically moving the said guide sleeve longitudinally to bring the tapered portions of the two sleeves into engagement and thereby clamp the jaws of said guide sleeve against the material, and cutters carried by the first sleeve around the path of movement of the material, said cutters being movably mounted for inward and outward movement toward and away from said material whereby the cutters may be moved inward toward the material when it is clamped and held against the movement, substantially as described.

3. In a machine of the class described, a support, a horizontal sleeve rotatably mounted therein, means for continuously driving the sleeve, a guide sleeve located in the first sleeve through which a length of material may be fed, clamping means on the guide sleeve, means for periodically operating said clamping means to engage and hold the material against lengthwise movement, tool holders slidably mounted at one end of the first sleeve for movement inward and outward toward the material, cutting tools carried at the inner ends of said tool holders, a member mounted for reciprocation on the end of said first sleeve, and means for moving said member back and forth on the sleeve, the same being formed on its inner sides to engage with outer ends of the tool holders and force the same inwardly when said member is moved in one direction, substantially as described.

4. In a machine of the class described, a support, a horizontal sleeve rotatably mounted therein, a movably mounted guide sleeve through which a length of material may be fed, a shaft, means for driving the same, means for continuously rotating the first sleeve, means connected to said guide sleeve and operated by the shaft for reciprocating the sleeve longitudinally once with each rotation of the shaft, means mounted around the guide sleeve with which said guide sleeve is brought into operative engagement to thereby clamp the material against longitudinal movement, cutting means carried at one end of the rotatably mounted sleeve, said means being slidable inward and outward toward and away from said material, a cylindrical member slidably mounted on the rotatable sleeve, and means connected therewith and operated by said shaft to cause the reciprocation of said member once with each revolution of the shaft to thereby force the cutting means inwardly toward said material, said movement occurring after said material has been clamped to hold it against longitudinal movement.

5. A construction containing the elements in combination defined in claim 16, combined with a movably mounted stop member adapted to be moved into the path of movement of the material as it is fed through the machine, and means connected with said stop member and operated by said shaft for moving the stop member to an inoperative position and then back to operative stopping position once during each revolution of said shaft.

6. In a construction of the class described, a support, a guide sleeve mounted on said support through which a length of material may be fed, a shaft, feeding means adapted to engage with said material to feed it through said guide sleeve, a rotatably mounted sleeve surrounding the guide sleeve, cutting means carried thereon movably mounted to move inwardly toward or away from said material, means operated by said shaft for moving the guide sleeve longitudinally, means associated with the guide sleeve to cause the same to clamp the material and hold it against longitudinal movement when said guide sleeve is thus moved longitudinally, a second means also operated by the shaft acting to force said cutting means inwardly when moved in one direction, a power shaft, means for driving the rotatable sleeve therefrom, additional means for driving the first shaft from the power shaft, separate manually operable means for connecting said first shaft with the power shaft and for connecting the power shaft with any suitable source of power, and means for simultaneously operating both of said means when one is manually operated to disconnect the first shaft from the power shaft and also disconnect the power shaft from said source of power, substantially as described.

In testimony whereof we affix our signatures.

WILLIAM LOTTERMAN.
LEONARD B. LESTER.
MERRITT K. ORTON.